(12) United States Patent
Yoshida (10) Patent No.: US 8,743,569 B2
(45) Date of Patent: Jun. 3, 2014

(54) POWER SUPPLY DEVICE

(75) Inventor: Michiho Yoshida, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 455 days.

(21) Appl. No.: 13/128,905

(22) PCT Filed: Oct. 13, 2009

(86) PCT No.: PCT/JP2009/067724
§ 371 (c)(1),
(2), (4) Date: May 12, 2011

(87) PCT Pub. No.: WO2010/064489
PCT Pub. Date: Jun. 10, 2010

(65) Prior Publication Data
US 2011/0211374 A1    Sep. 1, 2011

(30) Foreign Application Priority Data

Dec. 3, 2008    (JP) ................................. 2008-308434

(51) Int. Cl.
*H02M 5/45*    (2006.01)
*G05F 1/40*    (2006.01)

(52) U.S. Cl.
USPC ............................ 363/37; 323/284; 323/285

(58) Field of Classification Search
CPC ........ H02M 1/4225; H02M 5/44; G05F 1/565
USPC .............. 363/34, 37; 323/222, 225, 282–285; 318/801–803
See application file for complete search history.

(56) References Cited

U.S. PATENT DOCUMENTS

| 6,075,328 | A    | 6/2000  | Notohara et al. |
| 7,202,640 | B2 * | 4/2007  | Morita .......................... 323/205 |
| 7,808,202 | B2 * | 10/2010 | Tobari et al. .................. 318/801 |
| 8,232,780 | B2 * | 7/2012  | Uno .............................. 323/222 |
| 8,415,906 | B2 * | 4/2013  | Iwashita et al. ............... 318/376 |
| 8,416,590 | B2 * | 4/2013  | Yoshida et al. ................. 363/45 |

FOREIGN PATENT DOCUMENTS

| CN | 1064489 C      | 4/2001 |
| JP | 10-127083 A    | 5/1998 |
| JP | 2004-260871 A  | 9/2004 |
| JP | 2006-158100 A  | 6/2006 |
| JP | 2008-79474 A   | 4/2008 |
| JP | 2008-109723 A  | 5/2008 |

* cited by examiner

*Primary Examiner* — Matthew Nguyen
(74) *Attorney, Agent, or Firm* — Birch, Stewart, Kolasch & Birch, LLP (57) ABSTRACT

The present power supply device includes a microcomputer that detects a current input to an active filter, a voltage input to the active filter, and a voltage output from the active filter, decreases a target voltage as the input current increases, and controls an IGBT to turn on/off the IGBT to match the input current and the input voltage in phase with each other and also match the output voltage to the target voltage. Thus, as the input current increases, the target voltage is decreased. A loss caused at the IGBT can be reduced to be small.

6 Claims, 4 Drawing Sheets

| ADDRESS | DUp |
|---------|------|
| 0 | DUp0 |
| 1 | DUp1 |
| 2 | DUp2 |
| ⋮ | ⋮ |
| N-1 | DUpN-1 |
| N | DUpN |

POWER SUPPLY DEVICE

TECHNICAL FIELD

The present invention relates generally to power supply devices and particularly to power supply devices including an active filter.

BACKGROUND ART

Conventionally, power supply devices for air conditioners, refrigerators and the like receive alternate current (ac) voltage from commercial power supply, rectify the ac voltage by a rectifier circuit such as a diode bridge, smooth the rectified voltage by a smoothing circuit such as a capacitor to generate direct current (dc) voltage, convert the dc voltage by an inverter to ac voltage, and supply the ac voltage to an ac motor.

Such a power supply device's power factor is improved and its power supply harmonic current is reduced, by a method introducing an active filter between a rectifier circuit and a smoothing circuit to match an input current and an input voltage in waveform and phase, as described in Japanese Patent Laying-Open Nos. 2008-79474 (Patent Document 1) for example. Document 1 describes that detecting the input current, the input voltage and an output voltage and generating a signal controlling a switching element are all done by hardware (electronic circuitry).

Furthermore, there is also a method employing software to generate a signal controlling a switching element (See Japanese Patent Laying-open No. 2004-260871 (Patent Document 2) for example.). Document 2 describes that a target duty ratio is stored in an internal memory, only a voltage output from an active filter is detected, a signal controlling the switching element is generated to match the detected voltage to a target voltage, and an input current and an input voltage are not detected.

PRIOR ART DOCUMENTS

Patent Documents

Patent Document 1: Japanese Patent Laying-open No. 2008-79474
Patent Document 2: Japanese Patent Laying-open No. 2004-260871

SUMMARY OF THE INVENTION

Problems to be Solved by the Invention

Patent Document 1 employs hardware to generate the signal controlling the switching element, and can thus provide flexible control accommodating variation in the input current, input voltage and output voltage. However, it requires a large number of electric elements, and to mount them, a substrate having a large space is required, which invites an increased cost. Furthermore, a soft start circuit (e.g., an RC series circuit) is additionally required to prevent a duty ratio from steeply increasing when the power supply device starts up. This invites a further increased cost.

Furthermore, Patent Document 2 does not detect an input current or an input voltage, and if an input signal is disturbed and a duty ratio is to be corrected, or a duty ratio which does not require correction is provided, a loss at the switching element would increase. Furthermore, when the input voltage is decreased, the input voltage and the output voltage have an increased difference, and a loss at the switching element increases. This provides a possibility that the switching element may be destroyed.

Therefore a main object of the present invention is to provide a power supply device that is miniaturized and inexpensive and minimizes a loss caused at a switching element.

Means for Solving the Problems

The present power supply device includes: a rectifier circuit rectifying a first alternate current voltage; an active filter provided at a stage subsequent to the rectifier circuit; a smoothing circuit smoothing a voltage output from the active filter to generate direct current voltage; and an inverter converting the direct current voltage to a second alternate current voltage. The active filter includes: a reactor having one terminal receiving a voltage output from the rectifier circuit; a diode having an anode connected to the reactor at the other terminal, and a cathode connected to the smoothing circuit; and a switching element connected between the other terminal of the reactor and a line of a reference voltage. The present power supply device further includes a microcomputer operative to detect a current input to the active filter, a voltage input to the active filter, and the voltage output from the active filter and generate a target voltage based on the voltage input to the active filter, and control the switching element to turn on/off the switching element to match the current input to the active filter and the voltage input to the active filter in phase with each other and also match the voltage output from the active filter to the target voltage.

Preferably, the microcomputer decreases the target voltage as the voltage input to the active filter decreases.

Still preferably, if the current input to the active filter exceeds a first threshold current, the microcomputer stops controlling the switching element to turn on/off the switching element, and if the current input to the active filter exceeds a second threshold current larger than the first threshold current, the microcomputer further stops controlling the inverter. Furthermore, if the voltage output from the active filter exceeds a first threshold voltage, the microcomputer stops controlling the switching element to turn on/off the switching element, and if the voltage output from the active filter exceeds a second threshold voltage larger than the first threshold voltage, the microcomputer further stops controlling the inverter.

Still preferably, the microcomputer includes: a first calculation unit calculating a target duty ratio based on the voltage input to the active filter, the current input to the active filter, the voltage output from the active filter, and the target voltage; a storage unit having a duty ratio of a previous period stored therein; and a second calculation unit calculating a duty ratio for a current period, as based on the target duty ratio calculated by the first calculation unit and the duty ratio of the previous period stored in the storage unit.

Still preferably, the second calculation unit calculates the duty ratio for the current period to gradually decrease a deviation of the duty ratio of the previous period from the target duty ratio.

Still preferably, the second calculation unit calculates the duty ratio for the current period to gradually decrease a deviation of the duty ratio of the previous period from the target duty ratio when the power supply device starts up.

Still preferably, the second calculation unit calculates the duty ratio for the current period to gradually decrease a deviation of the duty ratio of the previous period from the target duty ratio if the deviation exceeds a threshold deviation.

Still preferably, if the current input to the active filter exceeds a first threshold current, the microcomputer stops controlling the switching element to turn on/off the switching element, and if the current input to the active filter exceeds a second threshold current larger than the first threshold current, the microcomputer further stops controlling the inverter. Furthermore, if the voltage output from the active filter exceeds a first threshold voltage, the microcomputer stops controlling the switching element to turn on/off the switching element, and if the voltage output from the active filter exceeds a second threshold voltage larger than the first threshold voltage, the microcomputer further stops controlling the inverter. The microcomputer includes: a first calculation unit calculating a target duty ratio based on the voltage input to the active filter, the current input to the active filter, the voltage output from the active filter, and the target voltage; a storage unit having a duty ratio of a previous period stored therein; and a second calculation unit calculating a duty ratio for a current period to gradually decrease a deviation of the duty ratio of the previous period stored in the storage unit from the target duty ratio calculated by the first calculation unit. The second calculation unit calculates the duty ratio for the current period to eliminate the deviation in a first period of time when the power supply device is restarted after controlling the switching element to turn on/off the switching element is simply stopped, and the second calculation unit calculates the duty ratio for the current period to eliminate the deviation in a second period of time shorter than the first period of time when the power supply device is restarted after controlling the inverter is stopped.

Effects of the Invention

The present power supply device is provided with a microcomputer operative to detect a current input to an active filter, a voltage input to the active filter, and a voltage output from the active filter and generate a target voltage based on the input voltage, and control a switching element to turn on/off the switching element to match the input current and the input voltage in phase with each other and also match the output voltage to the target voltage. As such, reducing the target voltage for example as the input voltage decreases allows a loss to be reduced that is caused at the switching element. Furthermore, the active filter is controlled by the microcomputer, and the device can be reduced in dimension and cost.

MODES FOR CARRYING OUT THE INVENTION

First Embodiment

Figure 1:
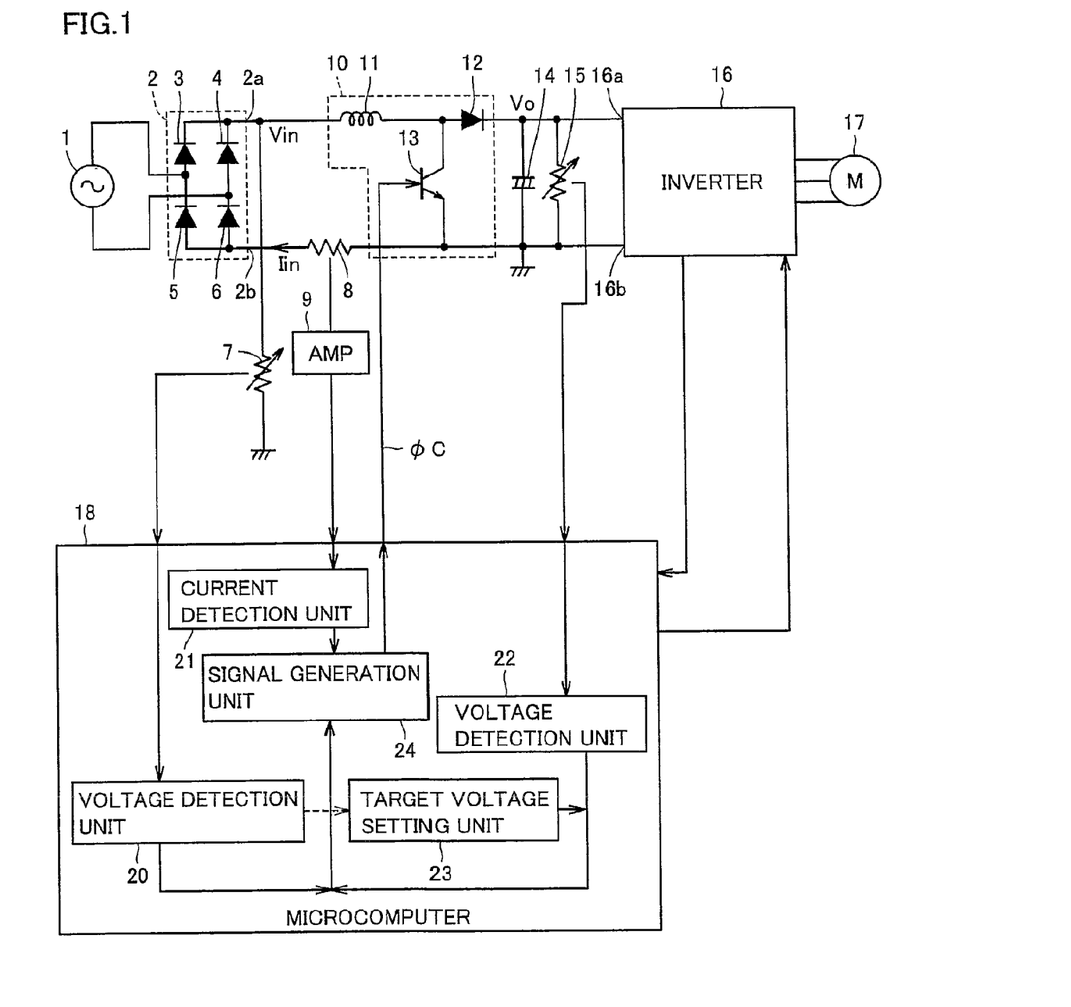
FIG. 1 is a block diagram showing a configuration of a power supply device in a first embodiment of the present invention.

FIG. 1 is a block diagram showing a configuration of a power supply device in a first embodiment of the present invention. In FIG. 1 the power supply device includes a rectifier circuit 2, resistors for voltage division 7 and 15, a resistor for current detection 8, an amplifier 9, an active filter 10, a smoothing capacitor 14, an inverter 16, and a microcomputer 18.

Rectifier circuit 2 includes four diodes 3-6 connected in the form of a bridge. It receives ac voltage from an ac power supply 1 and provides a full-wave rectification thereof. The ac voltage is provided between the anodes of diodes 3 and 4. Diodes 3, 4 have their respective cathodes both connected to a positive voltage output node 2a. Diodes 5, 6 have their respective cathodes connected to diodes 3, 4 at their respective anodes, respectively, and have their respective anodes both connected to a negative voltage output node 2b.

The resistor for voltage division 7 is connected between the rectifier circuit 2 positive voltage output node 2a and a line of a reference voltage. The resistor for voltage division 7 divides a voltage output from rectifier circuit 2, i.e., a voltage Vin input to active filter 10, to generate a signal representing input voltage Vin and provide the signal to microcomputer 18.

The resistor for current detection 8 is connected between the inverter 16 negative voltage input node 16b and the rectifier circuit 2 negative voltage output node 2b, and outputs a signal representing a current Iin input to active filter 10. Amplifier 9 receives the signal output from the resistor for current detection 8, amplifies the received signal and outputs the amplified signal to microcomputer 18. Inverter 16 has negative voltage input node 16b connected to a line of the reference voltage.

Active filter 10 includes a reactor 11, a diode 12, and an insulated gate bipolar transistor (IGBT) 13. Reactor 11 has one terminal connected to rectifier circuit 2 at positive voltage output node 2a. Diode 12 has an anode connected to reactor 11 at the other terminal, and a cathode connected to inverter 16 at a positive voltage input node 16a. IGBT 13 has a collector connected to reactor 11 at the other terminal, an emitter connected to a line of the reference voltage, and a gate receiving a control signal φC from microcomputer 18.

Smoothing capacitor 14 is connected between the diode 12 cathode and a line of the reference voltage. Smoothing capacitor 14 receives a voltage Vo output from active filter 10 to smooth voltage Vo to generate dc voltage. The resistor for voltage division 15 is connected to smoothing capacitor 14 in parallel. It receives voltage Vo output from active filter 10, divides voltage Vo to generate a signal representing output voltage Vo, and provides the signal to microcomputer 18. Inverter 16 receives voltage Vo output from active filter 10 to convert the voltage to 3-phase ac voltage and provides the 3-phase ac voltage to an ac motor 17.

Microcomputer 18 is operative in response to a dc current signal received from inverter 16, a signal received from motor 17 indicating a position of a rotor of the motor relative to a stator of the motor, and the like to control inverter 16. Furthermore, microcomputer 18 is operative in accordance with input voltage Vin, input current Iin, and output voltage Vo to control IGBT 13 to turn it on/off to match input voltage Vin and input current Iin in waveform and phase to bring a power factor close to one and also match output voltage Vo to a target voltage Vt. Furthermore, microcomputer 18 decreases target voltage Vt as input voltage Vin decreases.

More specifically, microcomputer 18 includes voltage detection units 20 and 22, a current detection unit 21, a target voltage setting unit 23, and a signal generation unit 24. Voltage detection unit 20 is operative in response to a signal received from the resistor for voltage division 7 to generate a digital signal representing voltage Vin input to active filter 10 in waveform, phase, amplitude and the like. Current detection unit 21 is operative in response to a signal received from amplifier 9 to generate a digital signal representing current Iin input to active filter 10 in waveform, phase, amplitude and the like. Voltage detection unit 22 is operative in response to a signal received from the resistor for voltage division 15 to generate a digital signal representing voltage Vo output from active filter 10 in level.

Target voltage setting unit 23 is operative in response to a signal received from voltage detection unit 20 to generate target voltage Vt. Target voltage Vt decreases as voltage Vin input to active filter 10 decreases. Signal generation unit 24 is operative in accordance with input voltage Vin, input current Iin, output voltage Vo and target voltage Vt to generate control signal $\phi C$ to control IGBT 13 to turn it on/off to match input voltage Vin and input current Iin in waveform and phase to bring a power factor close to one, and also to match output voltage Vo to target voltage Vt.

More specifically, control signal $\phi C$ is a function of input voltage Vin, input current Iin and output voltage Vo, and $\phi C=x$ (Vin, Iin, Vo). Furthermore, output voltage Vo is a function of target voltage Vt, output voltage Vo and input voltage Vin, and Vo=y (Vt, Vo, Vin). Input voltage Vin and output voltage Vo are controlled to have a fixed relationship. Furthermore, as input voltage Vin decreases, target voltage Vt decreases, so that if input voltage Vin decreases, electric power loss does not vary.

Control signal $\phi C$ turns on/off IGBT 13 periodically as determined by any set value stored in microcomputer 18. For example, a data-rewritable flash memory can be used to store any set value to allow the value to be modified. Considering noise and a power supply terminal having a voltage with a noise level, active filter 10 is switched at a frequency set at 15 kHz to 20 kHz in general.

Figure 2:
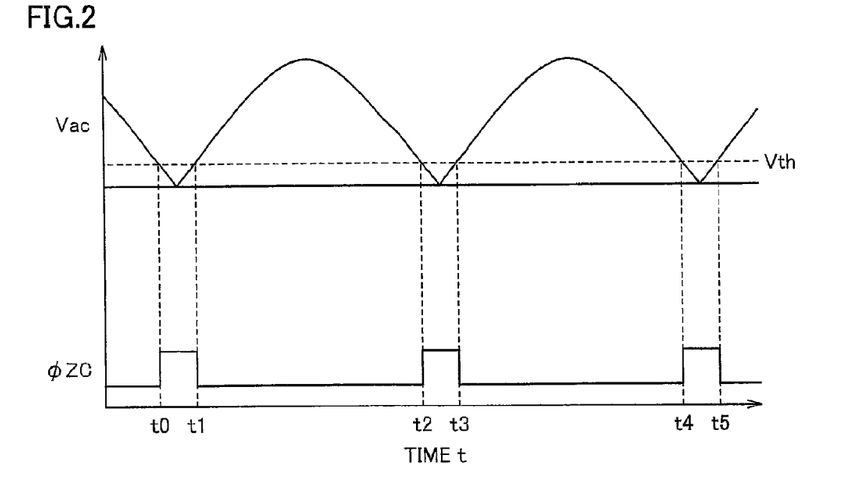
FIG. 2 represents a method of generating a zero cross detection signal in a microcomputer shown in FIG. 1.

Furthermore, control signal 4C is generated such that a zero cross detection signal $\phi ZC$ generated by microcomputer 18, as based on an input voltage Vac as shown in FIG. 2, serves as a trigger. Voltage Vac is sinusoidal ac voltage having undergone full wave rectification. Microcomputer 18 samples input voltage Vac, and when input voltage Vac is equal to or smaller than a preset threshold voltage Vth, microcomputer 18 pulls zero cross detection signal $\phi ZC$ high (at times t0, t2, t4), and when input voltage Vac is equal to or larger than threshold voltage Vth, microcomputer 18 pulls zero cross detection signal $\phi ZC$ low (at times t1, t3, t5), and zero cross detection signal VC is generated by using software.

Note that a circuit having a resistance element, a diode and a photo coupler combined together, a comparator or similar hardware may be employed to generate and input zero cross detection signal $\phi ZC$ to microcomputer 18 to serve as a trigger for outputting control signal $\phi C$.

In the first embodiment microcomputer 18 internally compares levels in voltage, generates control signal $\phi C$ for IGBT 13, and the like. More specifically, microcomputer 18 performs a basic operation including detecting input voltage Vin, input current Iin and output voltage Vo and matching input voltage Vin and input current Iin in phase with each other. This can contribute to a reduced hardware configuration and also provide an improved power factor and a reduced harmonic current.

Furthermore, as input voltage Vin decreases, target voltage Vt is decreased, and a loss caused at IGBT 13 can be reduced.

Second Embodiment

Such a power supply device as described above is generally provided with a means stopping the entire system's sequence control to protect IGBT 13 from damage when input current Iin or output voltage Vo is excessively large. Stopping inverter 16, however, would also stop a load, i.e., motor 17, which provides a large influence. Accordingly, in the second embodiment, before inverter 16 is stopped, controlling IGBT 13 is simply, first stopped to protect IGBT 13 from damage.

Figure 3:
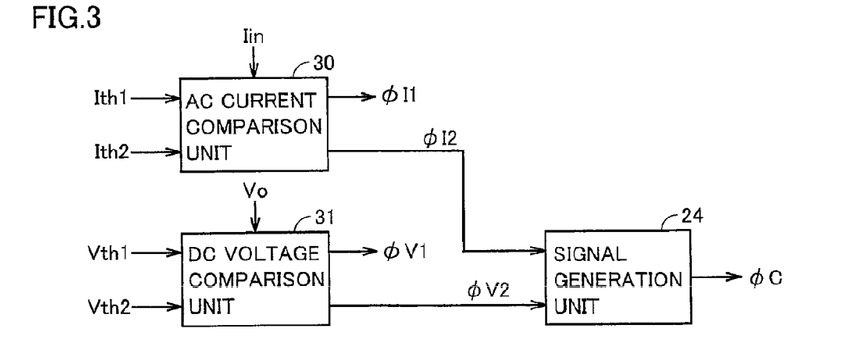
FIG. 3 is a block diagram showing a main portion of a power supply device in a second embodiment of the present invention.

FIG. 3 is a block diagram showing a main portion of a power supply device in the second embodiment of the present invention. This power supply device has a general configuration identical to that of the power supply device of the first embodiment. This power supply device includes microcomputer 18 internally having the FIG. 1 configuration plus an ac current comparison unit 30 and a dc voltage comparison unit 31.

Ac current comparison unit 30 is operative in response to a signal output from current detection unit 21 of FIG. 1 to obtain input current Iin, and compares input current Iin with a preset threshold currents Ith1, Ith2, wherein Ith1>Ith2. If Ith2>Iin, ac current comparison unit 30 pulls signals $\phi I1$ and $\phi I2$ both high. If Ith1>Iin>Ith2, ac current comparison unit 30 pulls signals $\phi I1$ and $\phi I2$ high and low, respectively. If Iin>Ith1 ac current comparison unit 30 pulls signals $\phi I1$, $\phi I2$ both low.

Dc voltage comparison unit 31 is operative in response to a signal output from voltage detection unit 22 of FIG. 1 to obtain output voltage Vo, and compares output voltage Vo with a preset threshold voltages Vth1, Vth2, wherein Vth1>Vth2. If Vth2>Vo, dc voltage comparison unit 31 pulls signals $\phi V1$ and $\phi V2$ both high. If Vth1>Vo>Vth2, dc voltage comparison unit 31 pulls signals $\phi V1$ and $\phi V2$ high and low, respectively. If Vo>Vth1, dc voltage comparison unit 31 pulls signals $\phi V1$ and $\phi V2$ both low.

If signals and $\phi I1$ and $\phi V1$ are both high, microcomputer 18 controls inverter 16, and if at least one of signals $\phi I1$, $\phi V1$ is pulled low, microcomputer 18 turns off all transistors in inverter 16 and thus stops controlling inverter 16. If signals $\phi I2$, $\phi V2$ are both high, signal generation unit 24 generates control signal $\phi C$ to control IGBT 13 to turn on/off IGBT 13, and if at least one of signals $\phi I2$, $\phi V2$ is pulled low, signal generation unit 24 stops generating control signal $\phi C$ to turn off IGBT 13.

In the second embodiment, before inverter 16 is stopped, controlling IGBT 13 is simply, first stopped. An effect on a load can be minimized and IGBT 13 can also be protected from damage.

Third Embodiment

Figure 4:
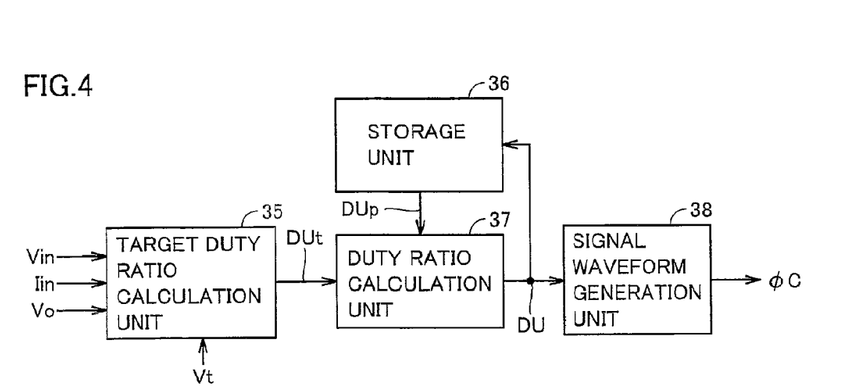
FIG. 4 is a block diagram showing a configuration of a power supply device in a third embodiment of the present invention.

FIG. 4 is a diagram showing a main portion of a power supply device in a third embodiment of the present invention. This power supply device has a general configuration identical to that of the power supply device of the first embodiment. This power supply device includes microcomputer 18 including signal generation unit 24 including a target duty ratio calculation unit 35, a storage unit 36, a duty ratio calculation unit 37, and a signal waveform generation unit 38.

Figure 5:
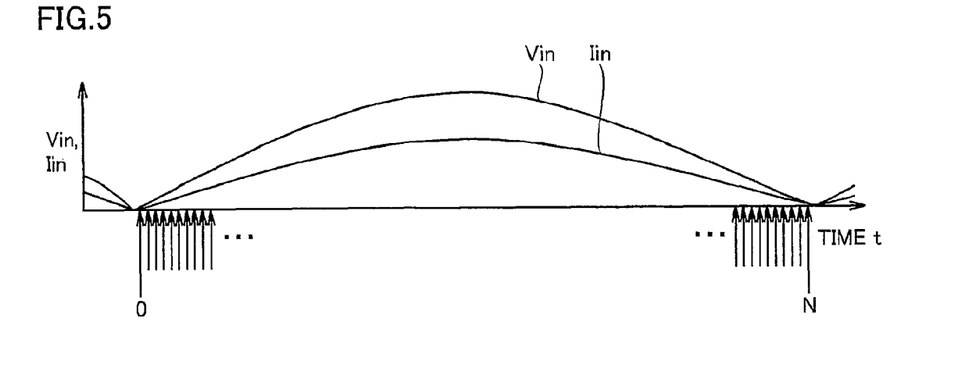
FIG. 5 is a diagram for illustrating an operation of a duty ratio calculation unit shown in FIG. 4.

As shown in FIG. 5, input voltage Vin and input current Iin have their one period divided into (N+1) segments, wherein N is a positive integer, and a duty ratio DU is set for each segment. Target duty ratio calculation unit 35 calculates a target duty ratio DUt, as based on input voltage Vin, input current Iin, output voltage Vo, and target voltage Vt, for each segment.

Figure 6:
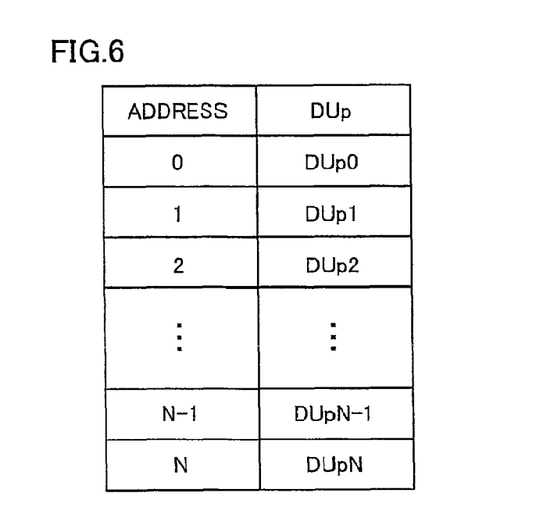
FIG. 6 is a diagram for illustrating an operation of a storage unit shown in FIG. 4.

As shown in FIG. 6, storage unit 36 has addresses 0-N at which are stored duty ratios DUp0-DUpN for all of the segments, respectively, of a previous period. Duty ratio calculation unit 37 calculates duty ratio DU for the current segment of the current period to gradually eliminate in a predetermined number of periods a deviation of a duty ratio DUp stored in storage unit 36 that corresponds to a segment of the previous period that corresponds to the current segment from target duty ratio DUt for the current segment. Signal waveform generation unit 38 generates control signal ϕC having a waveform based on duty ratio DU generated by duty ratio calculation unit 37.

In the third embodiment, input current Iin and output voltage Vo can be prevented from excessively, rapidly increasing, and IGBT 13 or a similar electronic element can be protected from damage.

Note that duty ratio DU may be approximated to target duty ratio DUt by employing PID control, a feedback control technique, or by a predetermined rate of the deviation at a time, or by another method.

Furthermore, duty ratio DUp stored in storage unit 36 may be rewritten for each period or may be rewritten for each desired period.

In the third embodiment duty ratio DU is controlled for each period to be gradually approximated to target duty ratio DUt. Alternatively, duty ratio DU may be controlled to be gradually approximated to target duty ratio DUt only when the device starts up, as target duty ratio DUt is rapidly increasable. Once duty ratio DU has reached a target duty ratio, duty ratio calculation unit 37 exactly sets target duty ratio DUt as duty ratio DU, and outputs it to signal waveform generation unit 38. Starting up as described above also includes normally starting up, as well as restarting after only stopping controlling IGBT 13, as has been described in the second embodiment, and restarting after stopping driving IGBT 13 and inverter 16. This exemplary variation can prevent input current Iin and output voltage Vo from excessively, rapidly increasing as duty ratio DU rapidly increases in starting up the device, and thus protect IGBT 13 or a similar electronic element from damage.

In the third embodiment duty ratio DU is controlled for each period to be gradually approximated to target duty ratio DUt. Alternatively, duty ratio DU may be adjusted only when target duty ratio DUt for the current segment and duty ratio DUp stored in storage unit 36 that corresponds to a corresponding segment of the previous period provide a deviation Dsa exceeding a predetermined threshold deviation Dth.

Figure 7:
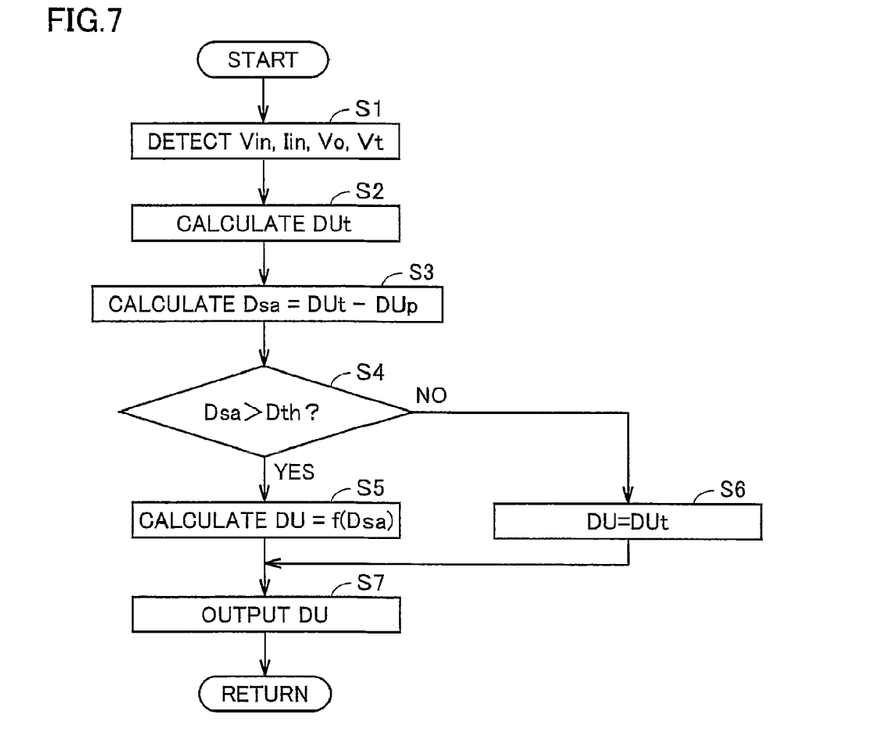
FIG. 7 is a flowchart representing the third embodiment in an exemplary variation.

FIG. 7 is a flowchart of an operation of signal generation unit 24 in such an exemplary variation. In FIG. 7, signal generation unit 24 detects input voltage Vin, input current Iin, output voltage Vo, and target voltage Vt (step S1), and therefrom calculates target duty ratio DUt (step S2). Subsequently, signal generation unit 24 calculates deviation Dsa of duty ratio DUp stored in storage unit 36 that corresponds to a segment of the previous period that corresponds to the current segment from target duty ratio DUt for the current segment (step S3), and signal generation unit 24 determines whether deviation Dsa is larger than threshold deviation Dth (step S4).

If Dsa is larger than Dth, signal generation unit 24 calculates duty ratio DU for the current segment in accordance with a function of deviation Dsa, or f(Dsa) (step S5). If Dsa is not larger than Dth, DU=DUt is set (step S6). Duty ratio DU calculated at step S5 or S6 is output (step S7), and the control returns to step S1. Note that function f(Dsa) used in step S5 is for example a function approximating duty ratio DU to target duty ratio DUt by a predetermined rate of deviation Dsa at a time. This exemplary variation can prevent input current Iin and output voltage Vo from excessively, rapidly increasing as duty ratio DU rapidly increases in starting up the device, thereafter driving it, and the like, and thus protect IGBT 13 or a similar electronic element from damage.

Figure 8:
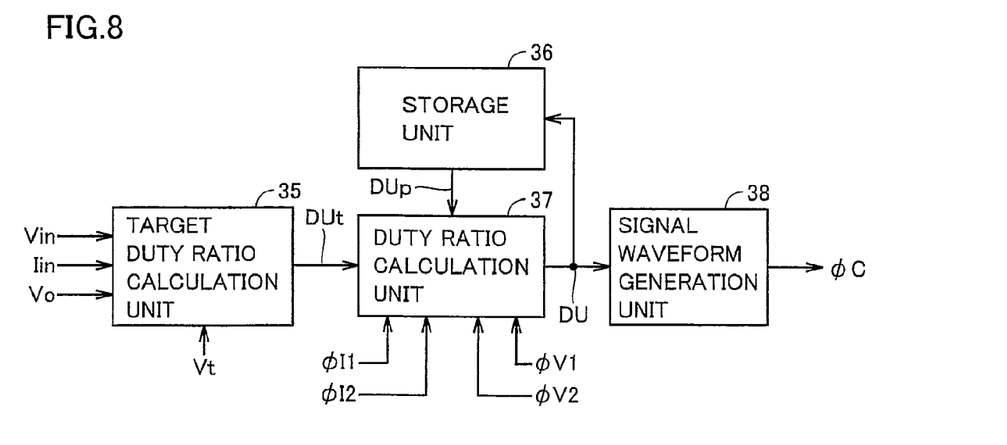
FIG. 8 is a block diagram for illustrating the third embodiment in another exemplary variation.

FIG. 8 is a block diagram showing a configuration of signal generation unit 24 in the third embodiment in still another exemplary variation, as compared with FIG. 4. In FIG. 8, this exemplary variation differs from the third embodiment in that duty ratio calculation unit 37 receives signals ϕI1, ϕI2, ϕV1, ϕV2 shown in FIG. 3. If signals ϕI2, ϕV2 are issued to stop controlling IGBT 13 to turn on/off IGBT 13 and controlling inverter 16 and the device is thereafter restarted, duty ratio calculation unit 37 adopts a function f1(Dsa) to approximate duty ratio DU to target duty ratio DUt by a relatively small rate of deviation Dsa at a time. Duty ratio DU is thus approximated to target duty ratio DUt at a relatively low speed. This is done for the following reason: In this case, the load impedance for active filter 10 is small, and if duty ratio DU rapidly increases, input current Iin and output voltage Vo rapidly increase, and IGBT 13 or a similar electronic element is destroyable.

If signals ϕI1, ϕV1 are issued to only stop controlling IGBT 13 to turn on/off IGBT 13 and the device is thereafter restarted, duty ratio calculation unit 37 adopts a function f2(Dsa) to approximate duty ratio DU to target duty ratio DUt by a relatively large rate of deviation Dsa at a time. Duty ratio DU is thus approximated to target duty ratio DUt at a relatively high speed. This is done for the following reason: In this case, inverter 16 is controlled and motor 17 is continuously driven to rotate. This requires dc voltage Vo, and resuming controlling IGBT 13 to turn on/off IGBT 13 does not readily, rapidly increase input current Iin and output voltage Vo. The present exemplary variation can protect IGBT 13 from damage and allows the device to be smoothly restarted.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

DESCRIPTION OF THE REFERENCE SIGNS

1: ac power supply, 2: rectifier circuit, 2a: positive voltage output node, 2b: negative voltage output node, 3-6: diode, 7, 15: resistor for voltage division, 8: resistor for current detection, 9: amplifier, 10: active filter, 11: reactor, 12: diode, 13: IGBT, 14: smoothing capacitor, 16: inverter, 16a: positive voltage input node, 16b: negative voltage input node, 17: ac motor, 18: microcomputer, 20, 22: voltage detection unit, 21: current detection unit, 23: target voltage setting unit, 24: signal generation unit, 30: ac current comparison unit, 31: do voltage comparison unit, 35: target duty ratio calculation unit, 36: storage unit, 37: duty ratio calculation unit, 38: signal waveform generation unit.

The invention claimed is:
1. A power supply device comprising:
a rectifier circuit rectifying a first alternate current voltage;
an active filter provided at a stage subsequent to said rectifier circuit;

a smoothing circuit smoothing a voltage output from said active filter to generate a direct current voltage;

an inverter converting said direct current voltage to a second alternate current voltage, said active filter including a reactor having one terminal receiving a voltage output from said rectifier circuit, a diode having an anode connected to said reactor at the other terminal, and a cathode connected to said smoothing circuit, and a switching element connected between the other terminal of said reactor and a line of a reference voltage; and a microcomputer operative to detect a current input to said active filter, a voltage input to said active filter, and said voltage output from said active filter and generate a target voltage based on said voltage input to said active filter, and control said switching element to turn on/off said switching element to match said current input to said active filter and said voltage input to said active filter in phase with each other and also match said voltage output from said active filter to said target voltage, wherein:

if said current input to said active filter exceeds a first threshold current, said microcomputer stops controlling said switching element to turn on/off said switching element, and if said current input to said active filter exceeds a second threshold current larger than said first threshold current, said microcomputer further stops controlling said inverter; and if said voltage output from said active filter exceeds a first threshold voltage, said microcomputer stops controlling said switching element to turn on/off said switching element, and if said voltage output from said active filter exceeds a second threshold voltage larger than said first threshold voltage, said microcomputer further stops controlling said inverter.

2. A power supply device comprising:

a rectifier circuit rectifying a first alternate current voltage;

an active filter provided at a stage subsequent to said rectifier circuit;

a smoothing circuit smoothing a voltage output from said active filter to generate a direct current voltage;

an inverter converting said direct current voltage to a second alternate current voltage, said active filter including a reactor having one terminal receiving a voltage output from said rectifier circuit, a diode having an anode connected to said reactor at the other terminal, and a cathode connected to said smoothing circuit, and a switching element connected between the other terminal of said reactor and a line of a reference voltage; and a microcomputer operative to detect a current input to said active filter, a voltage input to said active filter, and said voltage output from said active filter and generate a target voltage based on said voltage input to said active filter, and control said switching element to turn on/off said switching element to match said current input to said active filter and said voltage input to said active filter in phase with each other and also match said voltage output from said active filter to said target voltage, wherein said microcomputer includes:

a first calculation unit calculating a target duty ratio based on said voltage input to said active filter, said current input to said active filter, said voltage output from said active filter, and said target voltage;

a storage unit having a duty ratio of a previous period stored therein; and a second calculation unit calculating a duty ratio for a current period, as based on said target duty ratio calculated by said first calculation unit and said duty ratio of the previous period stored in said storage unit.

3. The power supply device according to claim 2, wherein said second calculation unit calculates said duty ratio for the current period to gradually decrease a deviation of said duty ratio of the previous period from said target duty ratio.

4. The power supply device according to claim 2, wherein said second calculation unit calculates said duty ratio for the current period to gradually decrease a deviation of said duty ratio of the previous period from said target duty ratio when the power supply device starts up.

5. The power supply device according to claim 2, wherein said second calculation unit calculates said duty ratio for the current period to gradually decrease a deviation of said duty ratio of the previous period from said target duty ratio if said deviation exceeds a threshold deviation.

6. A power supply device comprising:

a rectifier circuit rectifying a first alternate current voltage;

an active filter provided at a stage subsequent to said rectifier circuit;

a smoothing circuit smoothing a voltage output from said active filter to generate a direct current voltage;

an inverter converting said direct current voltage to a second alternate current voltage, said active filter including a reactor having one terminal receiving a voltage output from said rectifier circuit, a diode having an anode connected to said reactor at the other terminal, and a cathode connected to said smoothing circuit, and a switching element connected between the other terminal of said reactor and a line of a reference voltage; and a microcomputer operative to detect a current input to said active filter, a voltage input to said active filter, and said voltage output from said active filter and generate a target voltage based on said voltage input to said active filter, and control said switching element to turn on/off said switching element to match said current input to said active filter and said voltage input to said active filter in phase with each other and also match said voltage output from said active filter to said target voltage, wherein:

if said current input to said active filter exceeds a first threshold current, said microcomputer stops controlling said switching element to turn on/off said switching element, and if said current input to said active filter exceeds a second threshold current larger than said first threshold current, said microcomputer further stops controlling said inverter, and if said voltage output from said active filter exceeds a first threshold voltage, said microcomputer stops controlling said switching element to turn on/off said switching element, and if said voltage output from said active filter exceeds a second threshold voltage larger than said first threshold voltage, said microcomputer further stops controlling said inverter;

said microcomputer includes a first calculation unit calculating a target duty ratio based on said voltage input to said active filter, said current input to said active filter, said voltage output from said active filter, and said target voltage, a storage unit having a duty ratio of a previous period stored therein, and a second calculation unit calculating a duty ratio for a current period to gradually decrease a deviation of said duty ratio of the previous period stored in said storage unit from said target duty ratio calculated by said first calculation unit; and said second calculation unit calculates said duty ratio for the current period to eliminate said deviation in a first period of time when the power supply device is restarted after controlling said switching element to turn on/off said switching element is simply stopped, and said second calculation unit calculates said duty ratio for the current period to eliminate said deviation in a second period of time shorter than said first period of time when the power supply device is restarted after controlling said inverter is stopped.

* * * * *